US012590032B2

(12) United States Patent
Alapati et al.

(10) Patent No.: US 12,590,032 B2
(45) Date of Patent: Mar. 31, 2026

(54) TREATED CEMENT MATERIALS AND METHODS

(71) Applicant: Georgia Tech Research Corporation, Atlanta, GA (US)

(72) Inventors: Prasanth Alapati, Atlanta, GA (US); Kimberly E. Kurtis, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 566 days.

(21) Appl. No.: 18/007,926

(22) PCT Filed: Jun. 18, 2021

(86) PCT No.: PCT/US2021/038073
§ 371 (c)(1),
(2) Date: Dec. 2, 2022

(87) PCT Pub. No.: WO2021/257981
PCT Pub. Date: Dec. 23, 2021

(65) Prior Publication Data
US 2023/0234889 A1 Jul. 27, 2023

Related U.S. Application Data

(60) Provisional application No. 63/040,977, filed on Jun. 18, 2020.

(51) Int. Cl.
*C04B 28/06* (2006.01)
*C04B 7/32* (2006.01)
(Continued)

(52) U.S. Cl.
CPC ................ *C04B 28/06* (2013.01); *C04B 7/32* (2013.01); *C04B 16/0608* (2013.01);
(Continued)

(58) Field of Classification Search
None
See application file for complete search history.

(56) References Cited

U.S. PATENT DOCUMENTS

2016/0347661 A1* 12/2016 Youngblood ........... C04B 18/24
2018/0148630 A1 5/2018 Yakovlev et al.
(Continued)

OTHER PUBLICATIONS

Koehler et al. "Phase changes during the drying of calcium aluminate cement bond castables—the influence of curing and drying conditions" 2022, Cement, 7, 100020 (Year: 2022).*
(Continued)

*Primary Examiner* — Amber R Orlando
*Assistant Examiner* — Ryan Patrick Loughran
(74) *Attorney, Agent, or Firm* — TROUTMAN PEPPER LOCKE LLP; Ryan A. Schneider; Elsie Yang

(57) ABSTRACT

Disclosed herein are thermodynamically stable cement systems comprising a curing agent mixed with a CAC. The curing agent can be hydrophilic to attract bound water. In such a manner, the addition of the curing agent can treat the CAC. The treated material can then be cured to form a thermodynamically stable cement material. The curing agent can comprise a natural fiber material that comprises cellulose. Alternatively, or in addition, the curing agent can comprise cellulose nanoparticles, such as cellulose nanofibrils (CNFs) or cellulose nanocrystals (CNCs). Also disclosed herein are methods of making the same.

23 Claims, 13 Drawing Sheets

(51) Int. Cl.
  *C04B 16/06*　　　(2006.01)
  *C04B 24/38*　　　(2006.01)
  *C04B 40/02*　　　(2006.01)
  *C04B 111/00*　　　(2006.01)

(52) U.S. Cl.
  CPC ........ *C04B 24/383* (2013.01); *C04B 40/0263*
  　　　(2013.01); *C04B 2111/00198* (2013.01); *C04B*
  　　　　　　　　　　　　　　*2201/50* (2013.01)

(56)　　　　　　　References Cited

U.S. PATENT DOCUMENTS

2019/0062211　A1　　2/2019　Bindiganavile et al.
2019/0309211　A1　　10/2019　Yakovlev et al.

OTHER PUBLICATIONS

Texas Department of Transportation Technical Advisory, "Calcium
Aluminate Cement Concrete (Class CAC Concrete) TxDOT Special
Specification SS-4491 Tip Sheet" 2010 (Year: 2010).*
International Search Report and Written Opinion from PCT Appli-
cation No. PCT/US2021/038072 dated Nov. 5, 2021.

* cited by examiner

TREATED CEMENT MATERIALS AND METHODS

CROSS-REFERENCE TO RELATED APPLICATIONS

This application claims the benefit of U.S. Provisional Application Ser. No. 63/040,977, filed on 18 Jun. 2020, the entire contents and substance of which is incorporated herein by reference in its entirety as if fully set forth below.

FIELD OF THE DISCLOSURE

The present disclosure relates generally to treated cement systems and methods. Particularly, embodiments of the present disclosure relate to treated thermodynamically stable cement systems and methods of making the same.

BACKGROUND

Cement is an important construction material made by a reaction with water. Due to its simplicity and availability, cement is used in a variety of structures in many different environments around the world. Cement solidifies and hardens after mixing with water and placement due to a chemical process known as hydration. The water reacts with the cement, which bonds the other components together, eventually creating a stone-like material. Cement is used to make pavements, architectural structures, foundations, motorways/roads, bridges/overpasses, parking structures, brick/block walls and footings for gates, fences and poles.

In particular, calcium aluminate cement (CAC) remains an important material that can provide many advantages over conventional cement systems, such as Portland cement. However, the curing process of CAC can lead to significant increases in porosity due to conversion to more thermodynamically stable phases. As such, many advantages of CAC are offset by the compromise in compressive strength suffered as a result of the conversion process. At 23° C., CAC forms a hydrated metaphase. As bound water in the CAC releases and transitions the CAC from a low-density metaphase to a high-density thermodynamically stable phase, the structural integrity of the CAC is compromised.

What is needed, therefore, are treated cement systems and methods that are thermodynamically stable and do not suffer degradation of material properties after conversion. Embodiments of the present disclosure address this need as well as other needs that will become apparent upon reading the description below in conjunction with the drawings.

BRIEF SUMMARY OF THE DISCLOSURE

The present disclosure relates generally to treated cement systems and methods. Particularly, embodiments of the present disclosure relate to treated thermodynamically stable cement systems and methods of making the same.

An exemplary embodiment of the present disclosure can provide a method of forming a thermodynamically stable cement material, the method comprising: mixing a curing agent with a calcium aluminate cement (CAC), wherein the curing agent is hydrophilic; and curing the CAC to form the thermodynamically stable cement material.

In any of the embodiments disclosed herein, the thermodynamically stable cement material can have a bound water content from approximately 70% to approximately 80% of mix water (at 0.4 water-to-cement ratio) after approximately 65 hours of hydration time, and approximately 80% to approximately 90% of mix water (at 0.4 w/b) after approximately 28 days of hydration time.

In any of the embodiments disclosed herein, the thermodynamically stable cement material can have a bound water content increase from approximately 1% to approximately 15% when compared to the bound water content of the CAC materials without the curing agent after approximately 28 days of hydration time.

In any of the embodiments disclosed herein, the primary hydration product in the thermodynamically stable cement material can have a specific gravity from approximately 2 to approximately 3 compared to a specific gravity of approximately 1.5 to approximately 2 in CAC materials without the curing agent at both early ages (i.e., 65 hours) and later ages (i.e., 28 days).

In any of the embodiments disclosed herein, the thermodynamically stable cement material can have a formation factor increase up to approximately 8% when compared to the formation factor of the CAC materials without the curing agent after 65 hours.

In any of the embodiments disclosed herein, the thermodynamically stable cement material can have a formation factor increase up to approximately 35% when compared to the formation factor of the CAC materials without the curing agent after 28 days.

In any of the embodiments disclosed herein, the thermodynamically stable cement material can have a compressive strength difference of approximately 5% or less compared to the compressive strength of the CAC materials without the curing agent.

In any of the embodiments disclosed herein, the curing agent can comprise a natural fiber material comprising cellulose.

In any of the embodiments disclosed herein, the curing agent can comprise cellulose nanoparticles.

In any of the embodiments disclosed herein, the cellulose nanoparticles can be selected from the group consisting of: cellulose nanofibrils (CNFs) or cellulose nanocrystals (CNCs).

In any of the embodiments disclosed herein, the curing agent can comprise porous mineral aggregates.

In any of the embodiments disclosed herein, the curing agent can comprise lightweight mineral aggregates.

In any of the embodiments disclosed herein, the curing agent can comprise superabsorbent polymers.

In any of the embodiments disclosed herein, the curing agent can cause the curing to follow the reaction: $6CA + 60H \rightarrow 2C_3AH_6 + 4AH_3 + 36H$.

Also disclosed herein are thermodynamically stable cement materials comprising: a curing agent comprising a hydrophilic material; and a calcium aluminate cement (CAC).

These and other aspects of the present disclosure are described in the Detailed Description below and the accompanying figures. Other aspects and features of embodiments of the present disclosure will become apparent to those of ordinary skill in the art upon reviewing the following description of specific, exemplary embodiments of the present invention in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
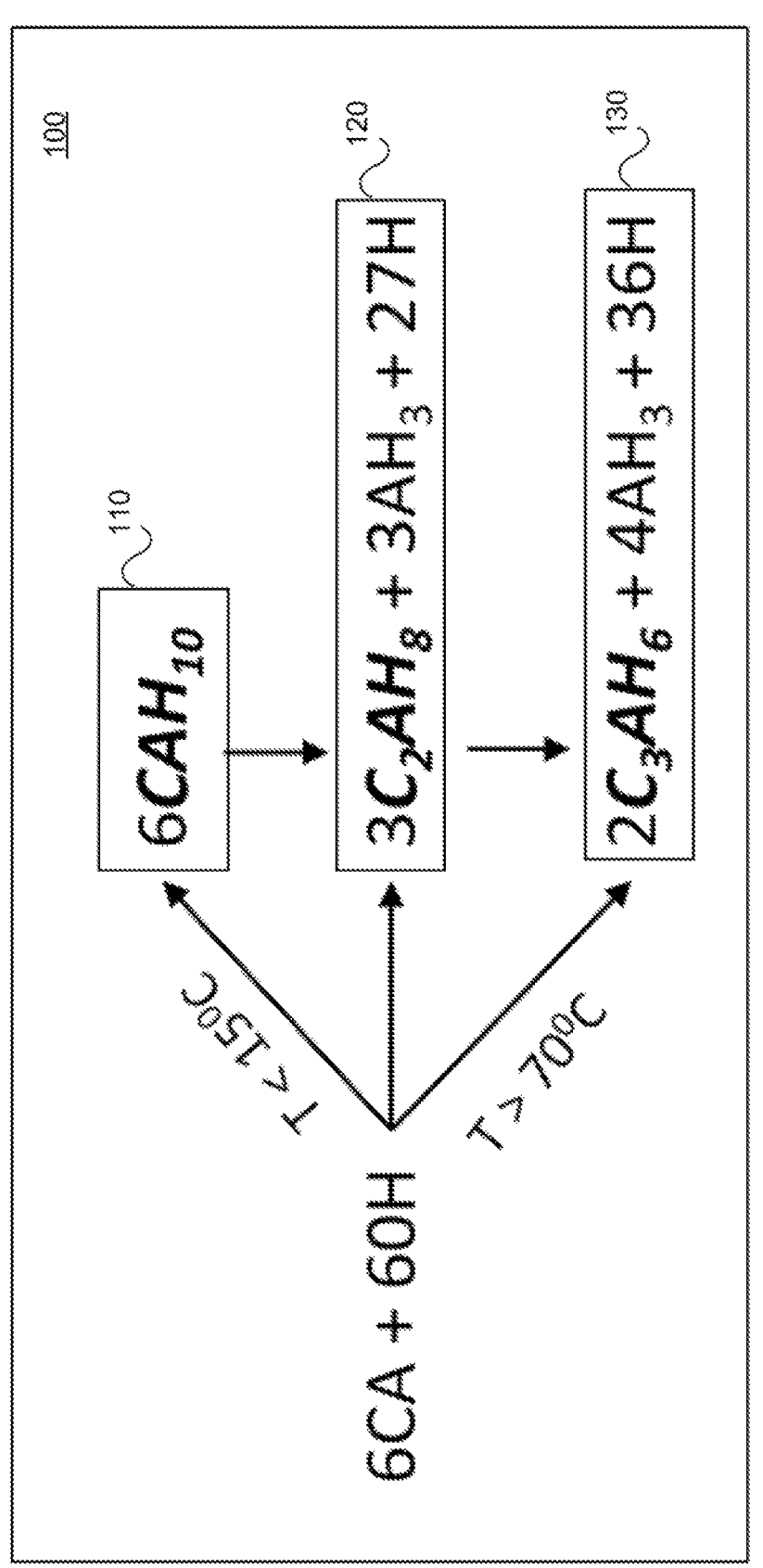
FIG. 1 illustrates a reaction mechanism for forming a thermodynamically stable cement material, in accordance with the present disclosure.

As stated above, a problem with current calcium aluminate cement (CAC) systems is that the curing process of CAC can lead to significant increases in porosity due to conversion to more thermodynamically stable phases. As such, many advantages of CAC are offset by the compromise in compressive strength suffered as a result of the conversion process. At 23° C., CAC forms a hydrated metaphase. As bound water in the CAC releases and transitions the CAC from a low-density metaphase to a high-density thermodynamically stable phase, the structural integrity of the CAC is compromised.

Disclosed herein are thermodynamically stable cement systems comprising a curing agent mixed with a CAC. The curing agent can be hydrophilic to attract bound water. In such a manner, the addition of the curing agent can treat the CAC. The treated material can then be cured to form a thermodynamically stable cement material. The curing agent can comprise a natural fiber material that comprises cellulose. Alternatively, or in addition, the curing agent can comprise cellulose nanoparticles, such as cellulose nanofibrils (CNFs) or cellulose nanocrystals (CNCs).

Cellulose fibers have been used in concrete materials to improve mechanical properties of materials: for example in US patent application 2005/112981 where cellulose fibers have been used to improve strength properties of dry specimens. Also, cellulose nanowhiskers have been studied as re-enforcement material in concrete, for example in a publication by Kuthcarlapati et al. (Metals Materials and Processes 20(3): 307-314, 2008). In addition, the major aim in the publications mentioned above has been to improve mechanical properties of dry specimens i.e. not to influence on wet formulations. Also, in the above-mentioned patent applications and publications, the used amount of cellulose fibers has been high.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Disclosed herein is a thermodynamically stable cement material. The cement can comprise a curing agent. The curing agent can comprise a natural fiber material which can further comprise cellulose. For example, the curing agent can comprise a natural fiber material from a wood source. Alternatively, or in addition, the curing agent can comprise cellulose nanoparticles, such as cellulose nanofibrils (CNFs) or cellulose nanocrystals (CNCs). The curing agent can also include non-natural and/or natural polymers, such as superabsorbent polymers. It is understood that the curing agent can include any suitable examples of the above materials so long as the curing agent comprises a hydrophilic material.

Alternatively, or in addition, the curing agent can comprise minerals, such as porous mineral aggregates and/or lightweight mineral aggregates. Suitable examples of porous mineral aggregates and/or lightweight mineral aggregates can include expanded shale, expanded slate, expanded clay, pumice, pumicite, vermiculite, perlite, and the like.

Suitable examples of wood sources can include hardwood, softwood, aspen, balsa, beech, birch, mahogany, hickory, maple, oak, teak, eucalyptus, pine, cedar, juniper, spruce, redwood, or any combination thereof. It is understood that any other known sources of wood fibers and lignocellulosic materials can be used. Alternatively, the natural fiber material can be provided in the form of natural non-wood or alternative fibers. Suitable examples of natural non-wood alternative fibers that can make up the fibrous material can include, for example, barley, bagasse, bamboo, wheat and wheat straw, flax, hemp, kenaf, *Arundo donax*, corn stalk, jute, ramie, cotton, wool, rye, rice, papyrus, esparto, sisal, grass, abaca, shrubs, miscanthus, giant reed, alfalfa, woody vines, flowers, wisteria, honeysuckle, clematis, kudzu, coffee and other beans/legumes, stevia and other functional plants, other lignocellulosic species, fast-growing grasses, or any combination thereof. It is understood that the natural fiber material can include any other natural fibers from any source or any combination of natural fibers. In some embodiments, the natural fiber material can be provided from cellulosic fibers that can be prepared from the wood pulp or otherwise provided fiber source by means of a mechanical process such as hammer-milling or other comminution processes.

Suitable examples of cellulose nanoparticles can include, but are not limited to, cellulose nanocrystals, cellulose nanofibers, nanofibrillated cellulose, bacterial nanocellulose, and the like. Suitable examples of a superabsorbent polymer can include sodium polyacrylate, potassium polyacrylate, polyacrylamide crystals, polyacrylamide plant spikes, poly(vinyl alcohol) (PVA), and the like. It is also to be understood that any suitable examples of cellulose nanoparticles and/or superabsorbent polymers can be used so long as the selected materials are hydrophilic.

The thermodynamically stable cement material can further comprise a calcium aluminate cement (CAC). An example reaction mechanism 100 for forming a CAC is shown in FIG. 1. As shown, when the CAC is mixed with water, the reaction mechanism 100 can form a first metaphase 110 and/or a second metaphase 120, or a combination thereof. The first metaphase 110 and the second metaphase 120 can be formed at relatively low temperatures, such as from approximately 15° C. to approximately 70° C. However, the first metaphase 110 and the second metaphase 120, which can lead to conversion from the first metaphase 110 and the second metaphase 120 to the thermodynamically stable phase 130. As shown, the conversion to the thermodynamically stable phase 130 can include a dehydration, or elimination, of bound water in the CAC. This dehydration can cause significant increases in porosity and reductions in compressive strength.

Because the thermodynamically stable phase 130 can form at temperatures of approximately 70° C., it is desirable to achieve other conversion/dehydration mechanisms. Without wishing to be bound by any particular scientific theory, the curing agent, including the hydrophilic material, can remove water from the reaction mechanism 100 or otherwise cause dehydration to occur. In such a manner, the formation of the thermodynamically stable phase 130 can be encouraged without the need for the additional high temperature requirements. In other words, the curing agent can discourage the reaction mechanism 100 from forming the first metaphase 110 and/or the second metaphase 120. In effect, the curing agent can cause the reaction mechanism to follow the reaction $6CA+60H \rightarrow 2C_3AH_6+4AH_3+36H$, wherein C represents calcium oxide, A represents aluminum oxide, and H represents water.

The thermodynamically stable phase 130 can also have a higher density than the first metaphase 110 and the second metaphase 120. Without wishing to be bound by any particular scientific theory, this increased density can be caused by the bound water not leaving behind voids in the cement. As such, the porosity of the thermodynamically stable phase 130 is also decreased when compared to the original system.

Due to the formation of the thermodynamically stable phase 130, the degradation of material properties caused by the conversion from the first metaphase 110 and the second metaphase 120 can be eliminated. In other words, directly forming the thermodynamically stable phase 130 using the addition of the curing agent can cause an increase in the material properties of the thermodynamically stable cement material when compared to a cement formed without a curing agent that goes through the conversion process from the first metaphase 110 and the second metaphase 120. Such increases in material properties can include, for example, bound water content, formation factor, compressive strength, extent of hydration, interconnectivity, and the like.

Figure 2:
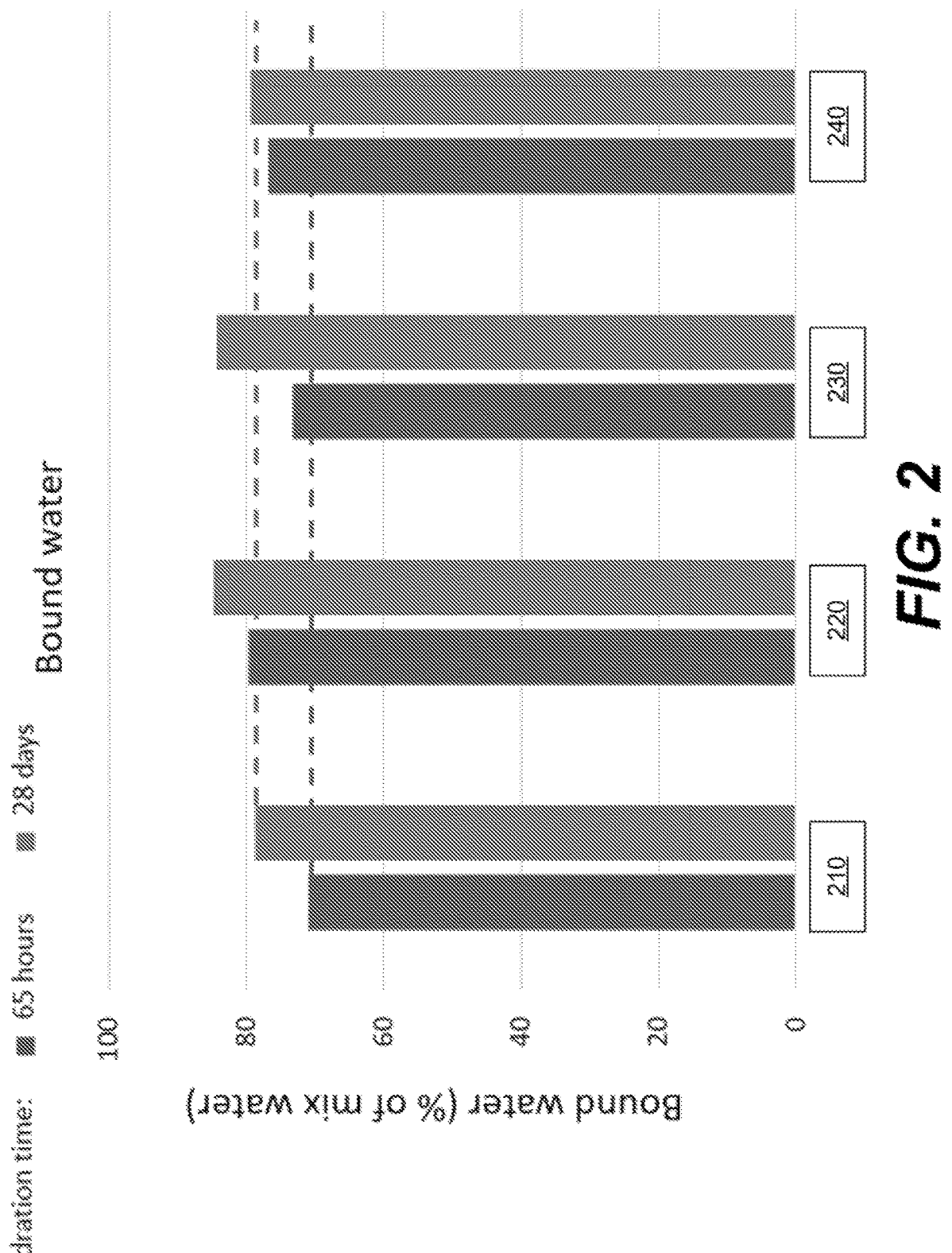
FIG. 2 illustrates a plot of the bound water content for a thermodynamically stable cement materials compared to CAC materials without curing agent, in accordance with the present disclosure.

FIG. 2 illustrates a plot of the bound water content for a thermodynamically stable cement material in accordance with the present disclosure. A cement material without a curing agent is depicted in element 210. Elements 220, 230, and 240 are examples of a thermodynamically stable cement material in accordance with the present disclosure. As shown, the thermodynamically stable cement materials can have a bound water content from approximately 70% to approximately 80% (e.g., from approximately 79% to approximately 80%, from approximately 73% to approximately 74%, or from approximately 76% to approximately 77%) after approximately 65 hours of hydration time at 0.4 water-to-cement ratio. After 28 days of hydration, the thermodynamically stable cement materials at 0.4 water-to-cement ratio can have a bound water content from approximately 79% to approximately 85% (e.g., from approximately 80% to approximately 85%, from approximately 84% to approximately 85%, from approximately 84% to approximately 85%, or from approximately 79% to approximately 80%).

Furthermore, when compared to a CAC materials with no curing agent, the thermodynamically stable cement materials can see a bound water content increase from approximately 1% to approximately 15% (e.g., from approximately 5% to approximately 15%, from approximately 3% to approximately 4%, or from approximately 8% to approximately 9%) after approximately 65 hours of hydration time.

The thermodynamically stable cement material can also see a bound water content increase of approximately 1% or greater (e.g., approximately 5% or greater, approximately 8% or greater, approximately 10% or greater, or approximately 15% or greater) compared to the bound water content of a CAC material with no curing agent after approximately 28 days of hydration time.

Figure 3:
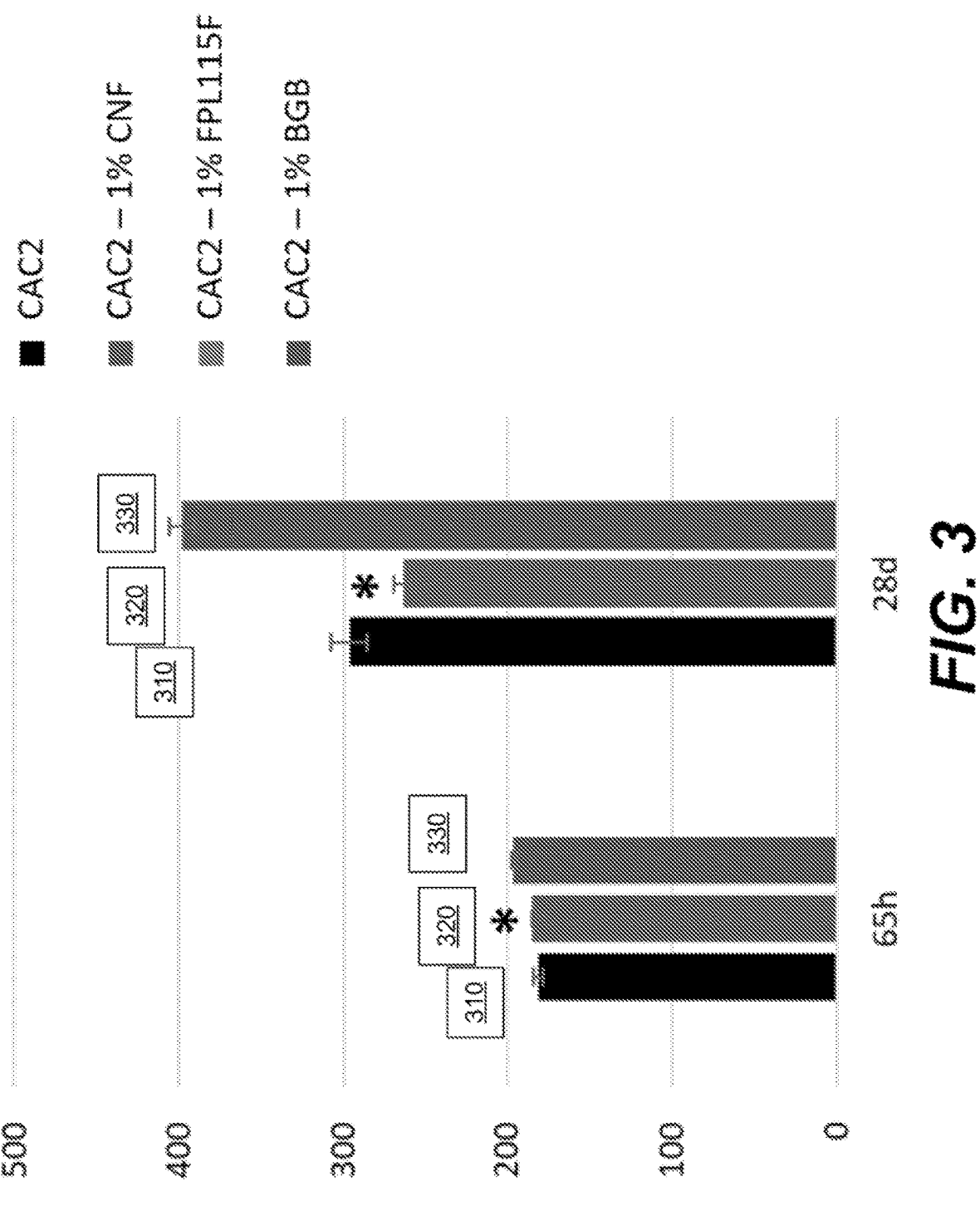
FIG. 3 illustrates a plot of the formation factor for a thermodynamically stable cement materials compared to CAC materials without curing agent, in accordance with the present disclosure.

FIG. 3 illustrates a plot of the formation factor for a thermodynamically stable cement material in accordance with the present disclosure. A cement material without a curing agent is depicted in element 310. Elements 320 and 330 are examples of a thermodynamically stable cement material in accordance with the present disclosure. As shown, the thermodynamically stable cement material can have a formation factor increase when compared to the formation factor of a CAC material with no curing agent. The formation factor can increase from approximately 1% to approximately 10% (e.g., from approximately 2% to approximately 9%, or from approximately 3% to approximately 8%, from approximately 4% to approximately 6%, from approximately 2% to approximately 10%, from approximately 3% to approximately 10%, from approximately 4% to approximately 10%, from approximately 5% to approximately 10%, from approximately 6% to approximately 10%, from approximately 7% to approximately 10%, or from approximately 8% to approximately 10%) after undergoing a curing process for approximately 65 hours.

Furthermore, the formation factor can increase to approximately 35% or less (e.g., approximately 34% or less, approximately 33% or less, approximately 32% or less, approximately 31% or less, approximately 30% or less, approximately 25% or less, approximately 20% or less, approximately 15% or less, or approximately 10% or less) after undergoing a curing process for approximately 28 days.

Figure 4:
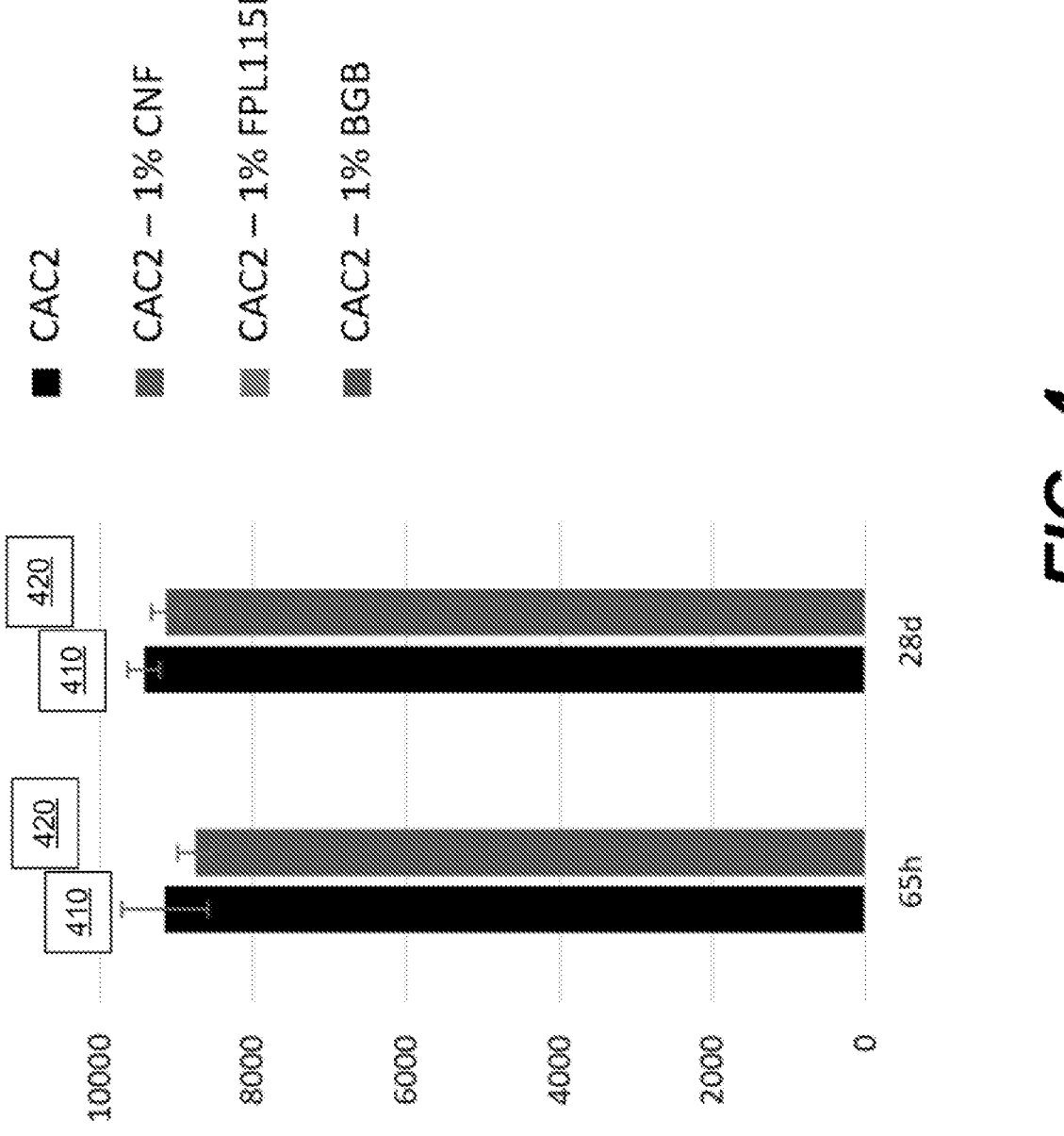
FIG. 4 illustrates a plot of the compressive strength for a thermodynamically stable cement materials compared to CAC materials without curing agent, in accordance with the present disclosure.

FIG. 4 illustrates a plot of the compressive strength for a thermodynamically stable cement material in accordance with the present disclosure. A cement material without a curing agent is depicted in element 410. Element 420 is an example of a thermodynamically stable cement material in accordance with the present disclosure. As shown, the compressive strength of the thermodynamically stable cement material can differ by approximately 5% or less (e.g., approximately 4% or less, approximately 3% or less, approximately 2% or less, or approximately 1% or less) when compared to the compressive strength of a CAC material with no curing agent at an early age (e.g., 65 hours in the examples) and a later age (e.g., 28 days in the examples). That is to say, the compressive strength of the thermodynamically stable cement material can be substantially similar to the compressive strength of a CAC material without the curing agent. Overtime, the CAC material without the curing agent can convert to the more thermodynamically stable phase, as outlined in FIG. 1, which can result in a significant loss of compressive strength compared to the thermodynamically stable cement materials.

Figure 5:
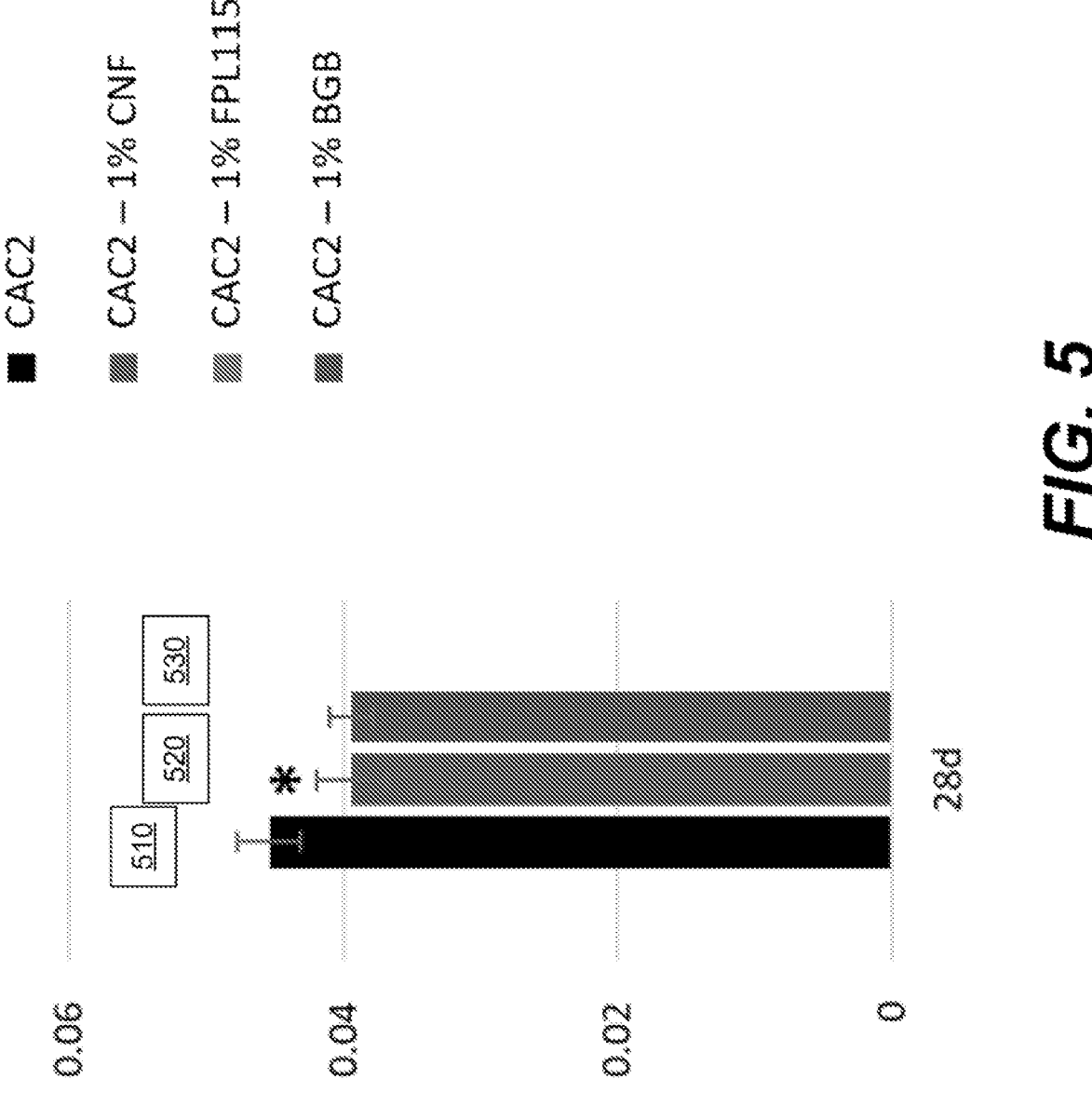
FIG. 5 illustrates a plot of the interconnectivity for a thermodynamically stable cement materials compared to CAC materials without curing agent, in accordance with the present disclosure.

FIG. 5 illustrates a plot of the interconnectivity for a thermodynamically stable cement material in accordance with the present disclosure. A cement material without a curing agent is depicted in element 510. Elements 520 and 530 are examples of a thermodynamically stable cement material in accordance with the present disclosure. As shown, the interconnectivity of the thermodynamically stable cement materials can decrease by approximately 5% or greater (e.g., approximately 10% or greater, or approximately 15% or more greater) when compared to the interconnectivity of a CAC material with no curing agent. Alternatively, or in addition, the interconnectivity of the thermodynamically stable cement materials can decrease from approximately 5% to approximately 25% (e.g., from approximately 5% to approximately 10%, from approximately 5% to approximately 15%, from approximately 5% to approximately 20%) when compared to the interconnectivity of a CAC material with no curing agent. That is to say, the interconnectivity of the thermodynamically stable cement material can be substantially lower compared to the interconnectivity of a CAC material without the curing agent. As would be appreciated, a lower interconnectivity can help to prevent harmful external agents from penetrating the thermodynamically stable cement material.

Figure 6:
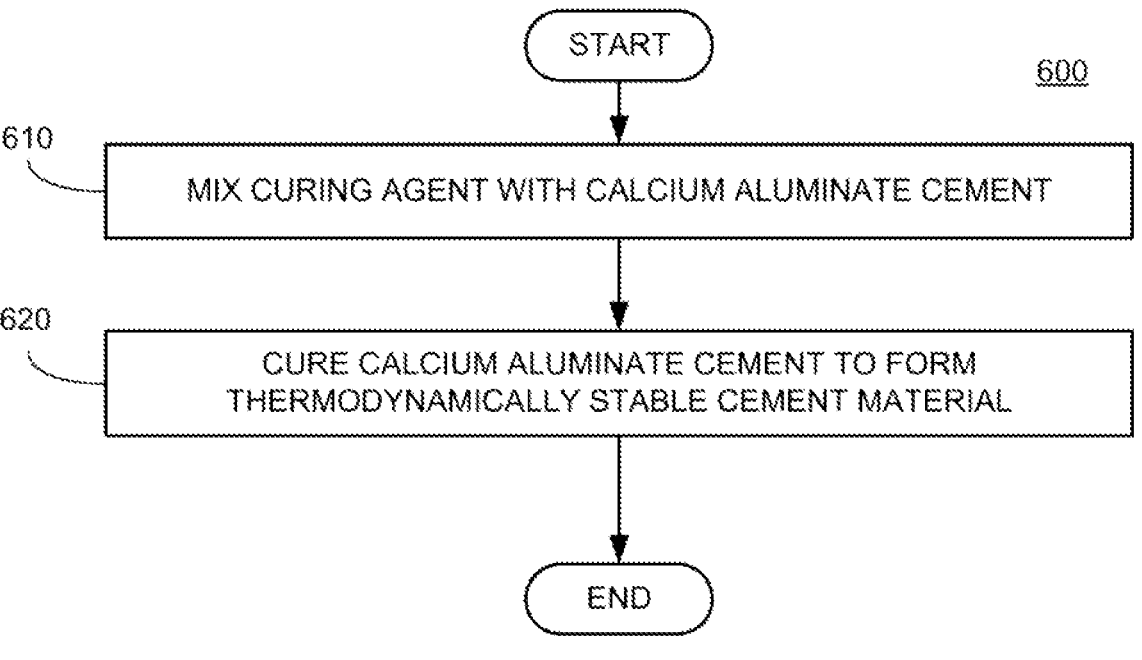
FIG. 6 illustrates a flowchart of a method of forming a thermodynamically stable cement material, in accordance with the present disclosure.

FIG. 6 illustrates a flowchart of a method 600 of forming a thermodynamically stable cement material. As shown, in block 610, the method 600 can comprise mixing a curing agent with a calcium aluminate cement (CAC). The curing agent can be hydrophilic and chosen according to the curing agents described above. The method can then proceed on to block 620.

As shown in block 620, the method 600 can comprise curing the CAC to form a thermodynamically stable cement material. The thermodynamically stable cement material can be thermodynamically stable according to the examples described above. The curing can cause the CAC to form the thermodynamically stable cement material by causing the CAC to follow a specific reaction mechanism, such as the reaction mechanism 100.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXAMPLES

Figure 7:
FIG. 7 illustrates a plot of heat evolution versus hydration time for a thermodynamically stable cement materials compared to CAC materials without curing agent, in accordance with the present disclosure.

A calcium aluminate cement (CAC) was mixed with a cellulose nanofiber (CNF) material, one non-TEMPO processed cellulose nanocrystal (CNC) material (FPL 115F), and one TEMPO processed carboxylate-based CNC material (BGB). The three samples with curing agents were cured at 23° C. The heat evolution was measured for the three examples and compared to a sample of the CAC material with no curing agent added. The heat evolution results are shown in FIG. 7. As shown, there is an increase in induction period with the addition of the curing agent. Furthermore, in 24 hours or less of hydration time, the total cumulative heat of all examples surpassed that of the sample with no curing agent, which can indicate higher extent of hydration compared to sample with no curing agent.

Figure 8A:
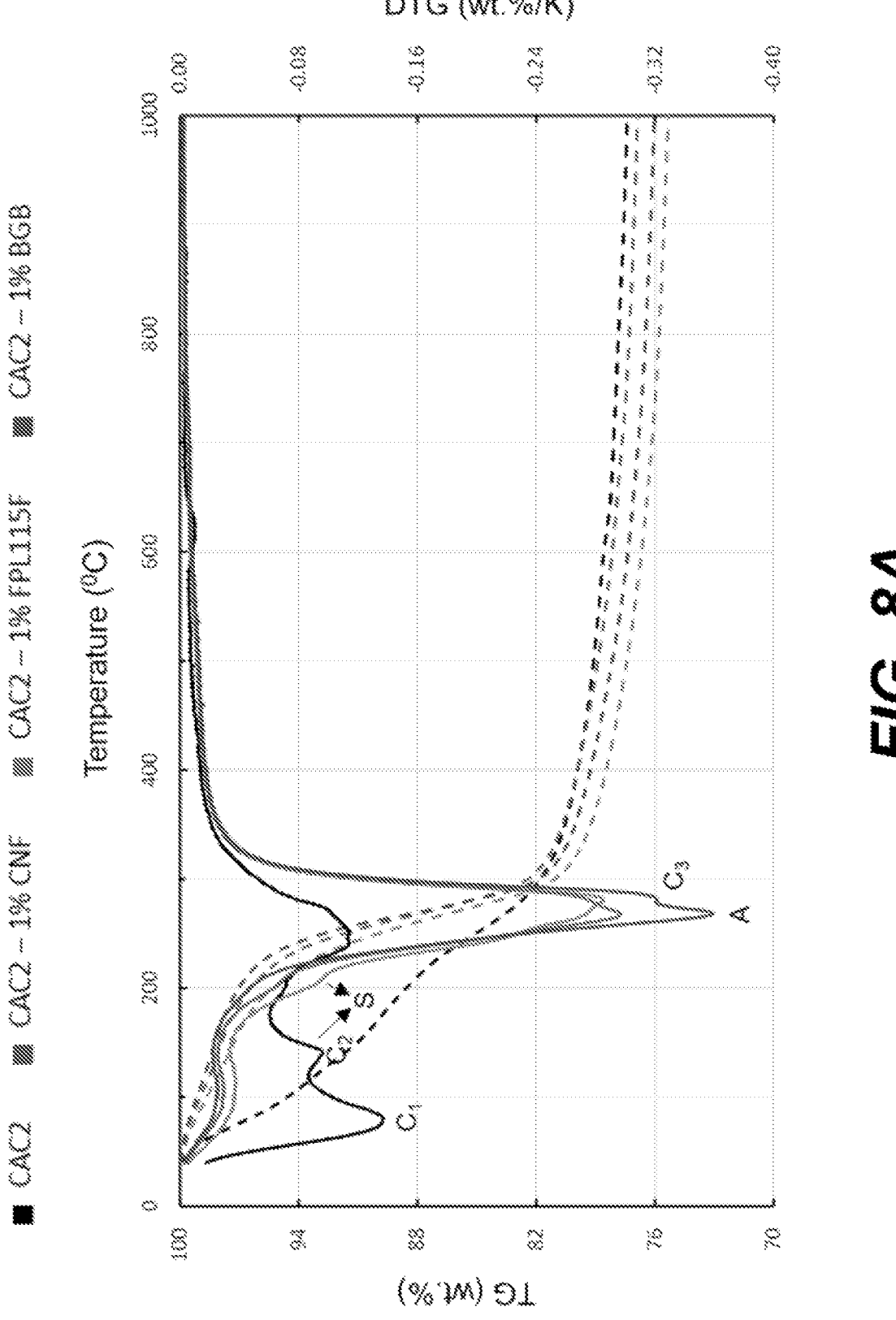
FIGS. 8A and 8B illustrate plots of a thermogravimetric analysis (TGA) of a thermodynamically stable cement materials compared to CAC materials without curing agent, in accordance with the present disclosure.
Figure 8B:
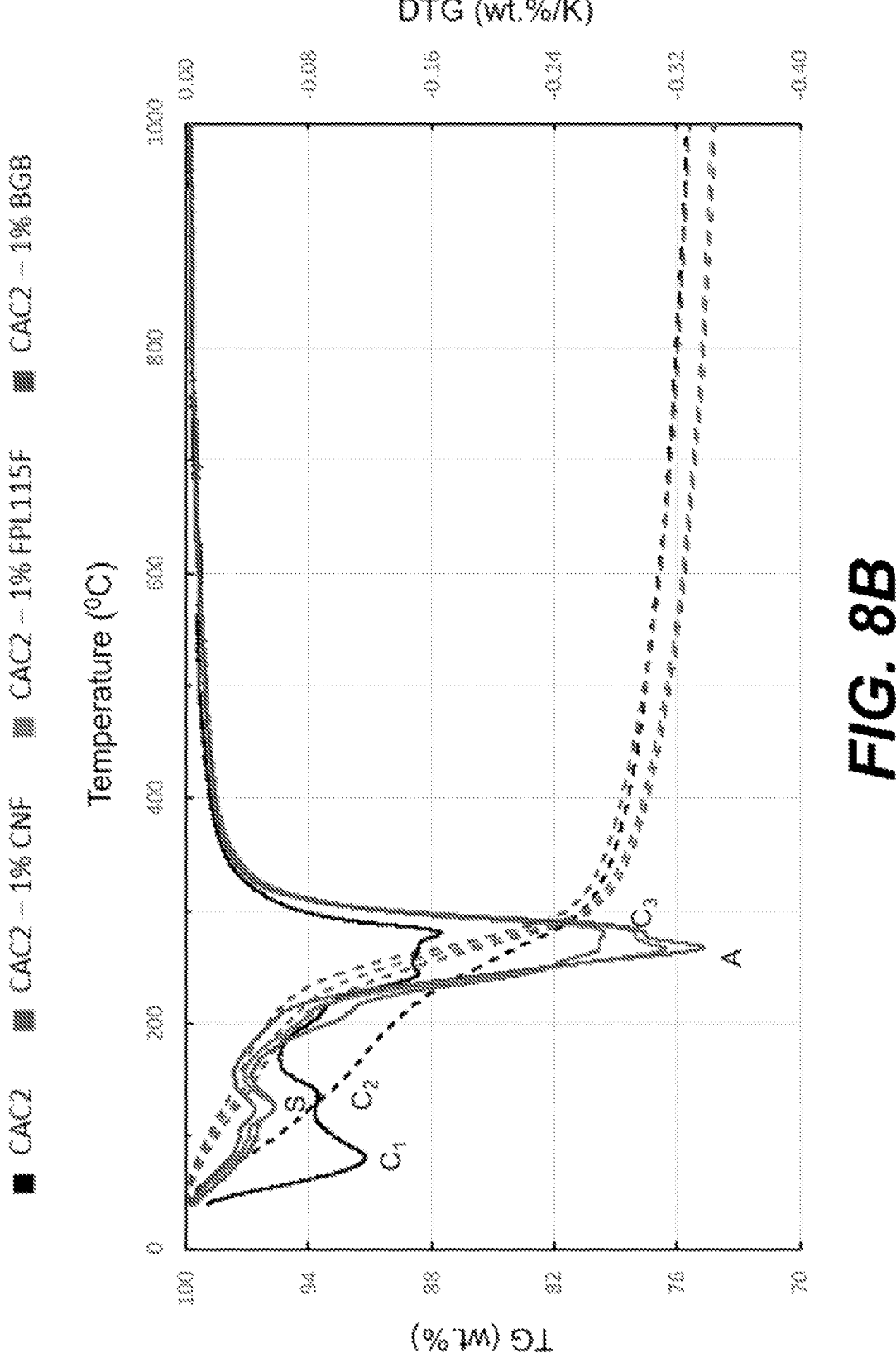

A thermogravimetric analysis (TGA) was carried out on the three examples and the sample with no curing agent, as shown in FIGS. 8A and 8B. As shown, the three examples with CNF and CNC added exhibited the formation of thermodynamically stable phases at early ages even when cured at 23° C. The TGA for 65 hours of hydration is shown in FIG. 8A, and the TGA for 28 days of hydration is shown in FIG. 8B. As shown, even after extended periods of hydration, the thermodynamically stable phases prevailed.

Figure 9A:
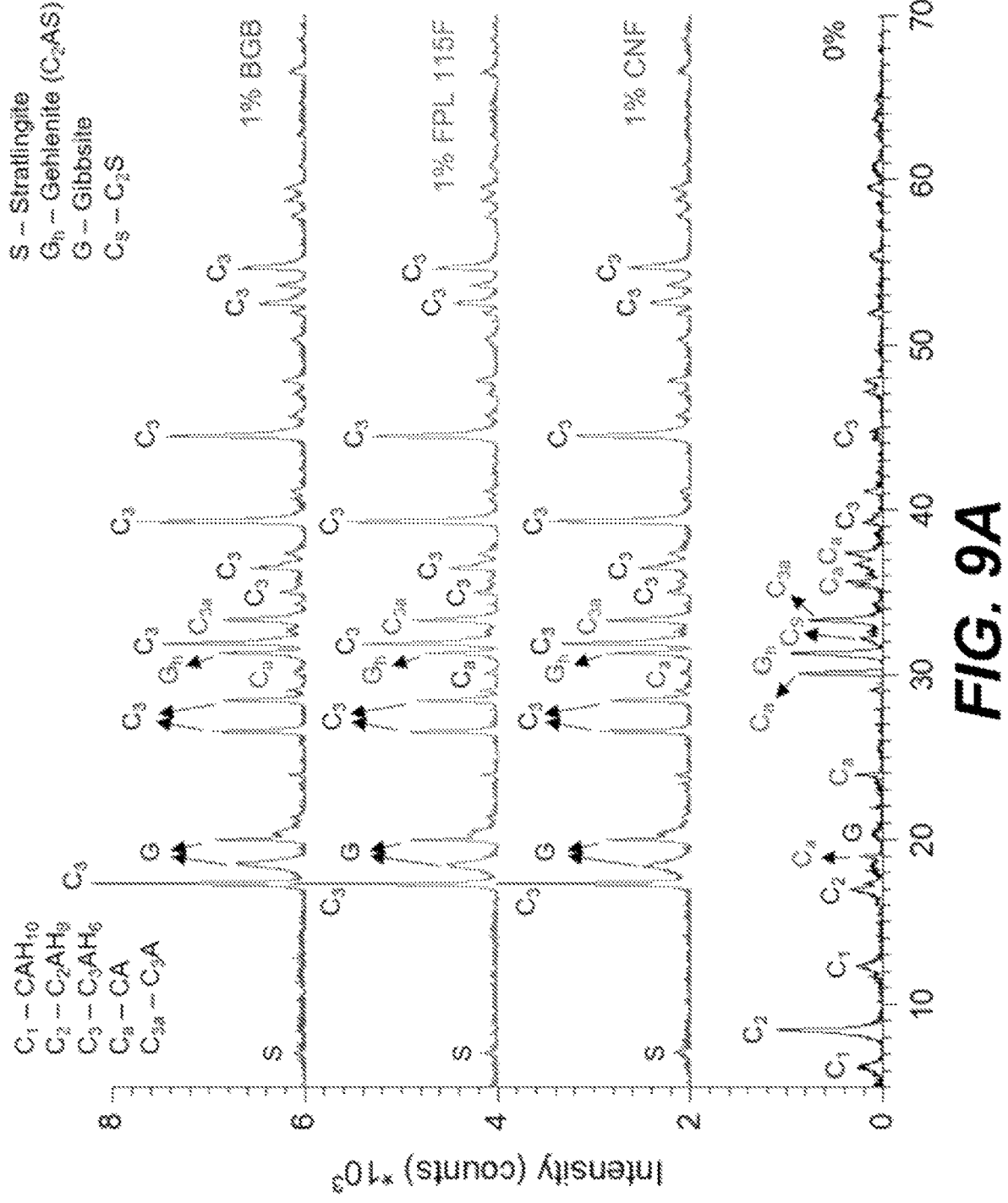
FIGS. 9A and 9B illustrate plots of an X-ray diffraction of a thermodynamically stable cement material, in accordance with the present disclosure.
Figure 9B:
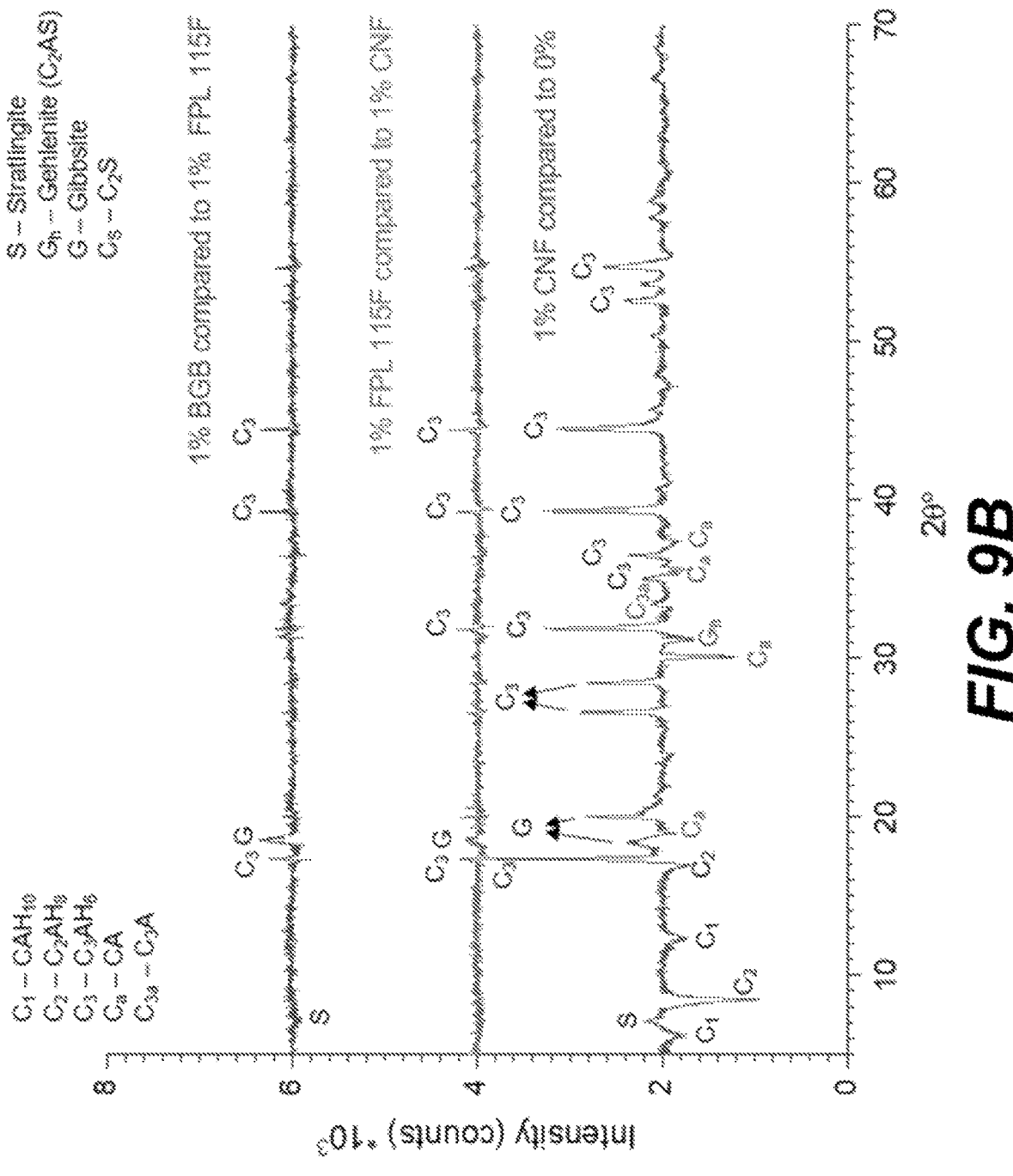
Figure 10A:
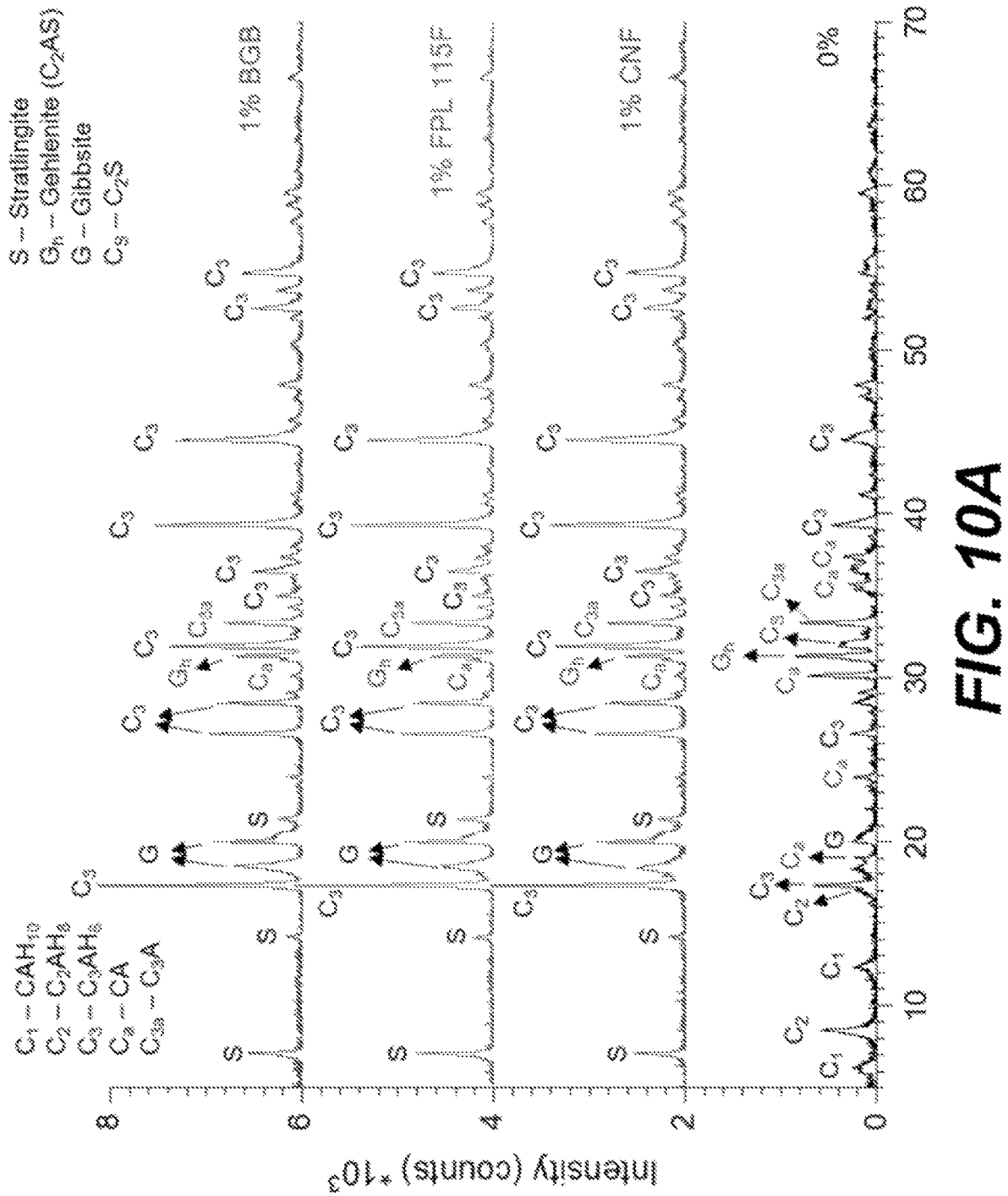
FIGS. 10A and 10B illustrate plots of an X-ray diffraction of another thermodynamically stable cement material, in accordance with the present disclosure.
Figure 10B:
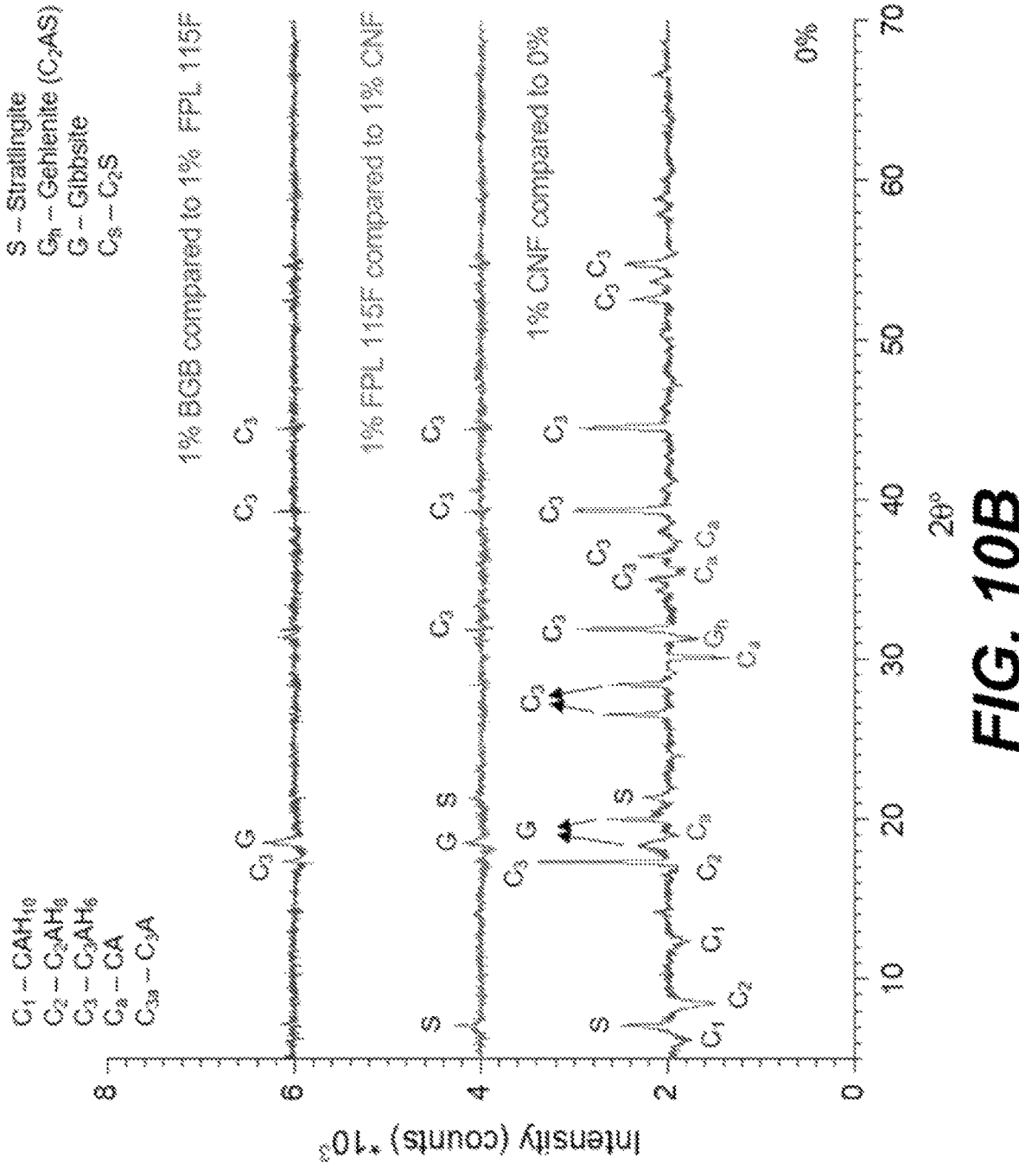

X-ray diffraction was performed on the three examples and the sample with no curing agent, as shown in FIGS. 9A and 9B. FIG. 9A illustrates the examples after 65 hours of hydration. FIG. 9B illustrates the differences between the three examples that comprise the curing agents. As shown, the addition of CNF and CNC can lead to the formation of thermodynamically stable phases at early ages even when cured at 23° C. Furthermore, a significantly higher extent of hydration can be observed with the addition of CNF and CNC. FIG. 10A illustrates the three examples and the sample with no curing agent after 28 days of hydration, and FIG. 10B illustrates the differences between the three examples that comprise the curing agents. As shown after 28 days of hydration time, the addition of CNF and CNC can lead to the formation of thermodynamically stable phases at early ages even when cured at 23° C. Furthermore, a significantly higher extent of hydration can be observed with the addition of CNF and CNC even after 28 days of hydration time.

What is claimed is:

1. In a method of forming a thermodynamically stable cement material comprising:
   mixing a curing agent with a cementitious material; and
   curing the mixed cementitious material at one or more curing temperatures through one or more metaphases until a thermodynamically stable phase is reached;
   the improvement comprising:
      mixing the curing agent with the cementitious material comprising a calcium aluminate cement (CAC); and
      curing the mixed CAC at one or more of the curing temperatures to directly form the thermodynamically stable phase, without forming one or more of the metaphases, to form the thermodynamically stable cement material.

2. The improved method of claim 1, wherein:
   the curing agent is hydrophilic;
   the curing temperatures are from between 15° C. to 70° C.; and
   the thermodynamically stable cement material has a bound water content from 70% to 80% after 65 hours of hydration time, and from 80% to 90% after 28 days of hydration time, respectively, at a 0.4 water-to-cement ratio.

3. The improved method of claim 2, wherein;
   the curing temperature of the thermodynamically stable phase is 23° C.; and
   the thermodynamically stable cement material has a bound water content increase from 5% to 15% when compared to the bound water content of the CAC without the curing agent after 65 hours of hydration time, and from 1% to 10% when compared to the bound water content of the CAC without the curing agent after 28 days of hydration time.

4. The improved method of claim 1, wherein:
   the curing agent is hydrophilic;
   the curing temperatures are from between 15° C. to 70° C.; and
   the thermodynamically stable phase has a specific gravity from 2 to 3 compared to a specific gravity of 1.5 to 2 in CAC materials without the curing agent.

5. The improved method of claim 1, wherein:
   the curing agent is hydrophilic;
   the curing temperatures are from between 15° C. to 70° C.; and
   the thermodynamically stable cement material has a formation factor increase from 1% to 10% when compared to the formation factor of the CAC without the curing agent after 65 hours.

6. The improved method of claim 5, wherein;
   the curing temperature of the thermodynamically stable phase is 23° C.; and
   the thermodynamically stable cement material has a formation factor increase by 35% when compared to the formation factor of the CAC without the curing agent after 28 days.

7. The improved method of claim 1, wherein:
   the curing agent is hydrophilic;
   the curing temperatures are from between 15° C. to 70° C.; and
   the thermodynamically stable cement material has a compressive strength difference of 5% or less compared to the compressive strength of the CAC without the curing agent.

8. The improved method of claim 1, wherein;
   the curing agent is hydrophilic;
   the curing temperatures are from between 15° C. to 70° C.; and
   the curing agent comprises a natural fiber material comprising cellulose.

9. The improved method of claim 1, wherein:
   the curing agent is hydrophilic;
   the curing temperatures are from between 15° C. to 70° C.; and
   the curing agent comprises cellulose nanoparticles.

10. The improved method of claim 9, wherein:
   the curing temperature of the thermodynamically stable phase is 23° C.; and
   the cellulose nanoparticles are selected from the group consisting of: cellulose nanofibrils (CNFs) or cellulose nanocrystals (CNCs).

11. The improved method of claim 1, wherein the curing agent causes the curing to follow the reaction: $6CA+60H \rightarrow 2C_3AH_6+4AH_3+36H$.

12. A thermodynamically stable cement material formed by the improved method of claim 1 comprising:
   the curing agent comprising a hydrophilic material; and
   the calcium aluminate cement (CAC).

13. The cement of claim 12, wherein the thermodynamically stable cement material has a bound water content from 70% to 80% after 65 hours of hydration time, and from 80% to 90% after 28 days of hydration time, respectively, at a 0.4 water-to-cement ratio.

14. The cement of claim 13, wherein the thermodynamically stable cement material has a bound water content increase from 5% to 15% when compared to the bound water content of the CAC without the curing agent after 65 hours of hydration time, and from 1% to 10% when compared to the bound water content of the CAC without the curing agent after 28 days of hydration time.

15. The cement of claim 12, wherein the thermodynamically stable cement material has a specific gravity from 2 to 3 compared to a specific gravity of 1.5 to 2 in CAC materials without the curing agent.

16. The cement of claim 12, wherein the thermodynamically stable cement material has a formation factor increase from 1% to 10% when compared to the formation factor of the CAC without the curing agent after 65 hours.

17. The cement of claim 16, wherein the thermodynamically stable cement material has a formation factor increase by 35% when compared to the formation factor of the CAC without the curing agent after 28 days.

18. The cement of claim 12, wherein the thermodynamically stable cement material has a compressive strength difference of 5% or less compared to the compressive strength of the CAC without the curing agent.

19. The cement of claim 12, wherein the curing agent further comprises a natural fiber material comprising cellulose.

20. The cement of claim 12, wherein the curing agent comprises cellulose nanoparticles.

21. The cement of claim 20, wherein the cellulose nanoparticles are selected from the group consisting of: cellulose nanofibrils (CNFs) or cellulose nanocrystals (CNCs).

22. The cement of claim 12, wherein the curing agent causes a curing reaction following the formula: $6CA+60H \rightarrow 2C_3AH_6+4AH_3+36H$.

23. A method of forming a thermodynamically stable cement material comprising:

mixing a curing agent with a calcium aluminate cement (CAC); and curing the mixed CAC at one or more curing temperatures to directly form a thermodynamically stable phase, without forming one or more metaphases, to form the thermodynamically stable cement material;

wherein the curing agent causes a curing reaction following the formula: $6CA+60H \rightarrow 2C_3AH_6+4AH_3+36H$.

\* \* \* \* \*